(12) United States Patent
Libutzki et al.

(10) Patent No.: US 12,196,685 B2
(45) Date of Patent: Jan. 14, 2025

(54) DEVICE AND METHOD FOR MONITORING THE DRYING/CURING PROCESS OF COATINGS

(71) Applicant: BASF Coatings GmbH, Münster (DE)

(72) Inventors: Harry Libutzki, Münster (DE); Daniel Briesenick, Münster (DE); Georg Wigger, Münster (DE); Kai Schaefer, Münster (DE); Jan Christopher Holzapfel, Münster (DE); Nico Reichert, Münster (DE)

(73) Assignee: BASF COATINGS GMBH, Muenster (DE)

( * ) Notice: Subject to any disclaimer, the term of this patent is extended or adjusted under 35 U.S.C. 154(b) by 288 days.

(21) Appl. No.: 17/629,930

(22) PCT Filed: Jul. 29, 2020

(86) PCT No.: PCT/EP2020/071384
§ 371 (c)(1),
(2) Date: Jan. 25, 2022

(87) PCT Pub. No.: WO2021/018954
PCT Pub. Date: Feb. 4, 2021

(65) Prior Publication Data
US 2022/0291135 A1    Sep. 15, 2022

(30) Foreign Application Priority Data
Jul. 29, 2019   (EP) ..................................... 19188838

(51) Int. Cl.
*G01N 21/88* (2006.01)
*B05D 3/02* (2006.01)
(Continued)

(52) U.S. Cl.
CPC ....... *G01N 21/8806* (2013.01); *B05D 3/0272* (2013.01); *F26B 3/28* (2013.01);
(Continued)

(58) Field of Classification Search
CPC ........... G01N 21/8851; G01N 21/8422; G01N 21/57; G01N 21/8806; G01N 21/47;
(Continued)

(56) References Cited

U.S. PATENT DOCUMENTS

| 3,732,016 A | * | 5/1973 | Deshayes | ........... | G01B 11/0625 |
| | | | | | 356/388 |
| 4,771,728 A | | 9/1988 | Bergman et al. | | |

(Continued)

FOREIGN PATENT DOCUMENTS

JP          5621498 B2 *  11/2014

OTHER PUBLICATIONS

International Search Report and Written Opinion for corresponding PCT/EP2020/071384 mailed Oct. 12, 2020, 8 Pages.

*Primary Examiner* — Hoa Q Pham
(74) *Attorney, Agent, or Firm* — Armstrong Teasdale LLP (57) ABSTRACT

Described herein is a device for monitoring and drying and/or curing process of a coating composition applied at least partially onto at least one surface of a substrate, the device including a movable skid that includes at least one substrate holding unit, at least one lamp, at least one pattern holder including a pattern, and at least one camera, where the substrate holding unit, lamp and pattern holder are positioned on the skid relative to each other such that the light of the lamp can illuminate the pattern of the pattern holder, and the illumination can be projected onto the surface of the substrate, which is held by the substrate holding unit, and where the camera is positioned on the skid relative to the substrate holding unit holding the substrate, (Continued)

such that the camera is capable of recording images of the light reflected off the surface of the substrate.

21 Claims, 5 Drawing Sheets

(51) Int. Cl.
*F26B 3/28* (2006.01)
*G01N 21/47* (2006.01)
*G01N 21/84* (2006.01)
*G01N 21/17* (2006.01)

(52) U.S. Cl.
CPC ......... *G01N 21/47* (2013.01); *G01N 21/8422* (2013.01); *G01N 2021/177* (2013.01); *G01N 2021/4735* (2013.01); *G01N 2021/8427* (2013.01)

(58) Field of Classification Search
CPC ... G01N 2021/8427; G01N 2021/8908; G01N 2021/177; G06T 7/90; G06T 7/0002; G06T 2207/30156; G06T 2207/30168; G01B 11/0616; G01B 11/06; G01B 11/254; G01B 21/08; F26B 3/28; B05D 3/0272
USPC ............................ 356/237.1–237.5, 601–632
See application file for complete search history.

(56) References Cited

U.S. PATENT DOCUMENTS

| | | | |
|---|---|---|---|
| 5,237,404 A * | 8/1993 | Tanaka | G01B 11/303 356/613 |
| 5,436,726 A * | 7/1995 | Ventura | G01N 21/8806 356/613 |
| 6,532,066 B1 | 3/2003 | Filev et al. | |
| 2006/0002986 A1* | 1/2006 | Clarke | A61K 9/2072 424/443 |
| 2008/0144044 A1* | 6/2008 | Ehrick | G01B 11/25 356/610 |
| 2009/0141287 A1* | 6/2009 | Sato | G06T 7/521 356/610 |
| 2014/0127395 A1 | 5/2014 | Steenhoek et al. | |
| 2015/0146178 A1 | 5/2015 | Devilliers et al. | |

* cited by examiner

DEVICE AND METHOD FOR MONITORING THE DRYING/CURING PROCESS OF COATINGS

CROSS-REFERENCE TO RELATED APPLICATIONS

This application is a U.S. National Phase Application of International Patent Application No. PCT/EP2020/071384, filed Jul. 29, 2020, which claims priority to European Patent Application No. 19188838.7, filed Jul. 29, 2019, the entire contents of which are hereby incorporated by reference herein.

The present invention relates to a device for monitoring the drying and/or curing process of a coating composition applied at least partially onto at least one surface of a substrate, said device comprising a movable skid (1), which skid (1) in turn comprises at least one substrate holding unit (2), at least one lamp (3) used as light source, at least one pattern holder (4) including a pattern, as well as at least one camera (5), wherein substrate holding unit (2), lamp (3) and pattern holder (4) are positioned on skid (1) relative to each other such that light of lamp (3) can illuminate the pattern of pattern holder (4), and after said illumination can be projected onto the surface of the substrate, which is held by the substrate holding unit (2), and wherein camera (5) is positioned on the skid (1) relative to substrate holding unit (2) holding the substrate, such that camera (5) is capable of recording images of the light reflected off the surface of said substrate, a use of said device for monitoring the drying and/or curing process of a coating composition applied onto the surface of a substrate, a corresponding method making use of said device as well as a kit-of-parts comprising the device and an oven, as well as to a method of evaluating appearance properties and/or surface properties of a coating obtained by applying the coating composition during drying and/or curing.

BACKGROUND

Nowadays, in the automobile industry coatings compositions—after having been applied to suitable optionally pre-coated substrates—are typically subjected to a drying and/or curing procedure in order to obtain dried and/or cured coatings therefrom. Said drying and/or curing procedure(s) are typically performed in an oven at temperatures in the range from 60° C. to 180° C. During the drying and/or curing process the volatile portions such as organic solvents evaporate. It is usually desired to obtain resulting coating films having a smooth surface, in particular in case clearcoat compositions are applied. However, after having performed the aforementioned drying and/or curing procedure, sometimes unwanted sagging behavior is observed and the resulting appearance of the coating film is rather poor. It is likely that the evaporation of the volatile portions of the coating compositions used and/or the crosslinking process taking place in the oven are responsible for or at least contributes to the undesired and negative change of the surface and/or appearance properties that result after having performed the drying and/or curing.

In order to monitor the drying and/or curing process it is not an option to, e.g., use a transparent oven such as an oven comprising four glass walls, a heating system and a camera device in order to monitor the drying and/or curing from the outside, since a drying and/or curing process performed in such an oven would not resemble the respective process performed under real conditions in automotive OEM or refinish manufacture, as glass ovens cannot be used these processes, at least due to safety regulations and/or for economic reasons.

Thus, there is a need for a means and for a method of monitoring the drying and/or curing process of coating compositions applied onto optionally pre-coated suitable substrates, in particular in the field of the automotive industry, which resemble real conditions applied in automotive OEM or refinish manufactures as much as possible. Further, there is a need to gain insights into the aforementioned drying and/or curing processes, in particular with respect to studying the occurrence of surface and/or optical defects of the resulting coatings and, further, with respect to avoiding or at least minimizing these defects.

Problem

A problem addressed by the present invention, therefore, is that of providing a means and a method of monitoring the drying and/or curing process of coating compositions applied onto optionally pre-coated suitable substrates, in particular in the field of the automotive industry, which resemble real conditions applied in automotive OEM or refinish manufactures as much as possible, and which allows to gain insights into the drying and/or curing process, in particular with respect to studying the occurrence of surface and/or optical defects of the resulting coatings and, further, with respect to avoiding or at least minimizing these defects.

Solution

This problem is solved by the subject matter claimed in the claims and also by the preferred embodiments of that subject matter that are described in the description hereinafter.

A first subject-matter of the present invention is a device for monitoring the drying and/or curing process of a coating composition applied at least partially onto at least one surface of a substrate, said device comprising a movable skid (1), which skid (1) in turn comprises

- at least one substrate holding unit (2) for holding the substrate, to which surface the coating composition has been applied to,
- at least one lamp (3) used as light source,
- at least one pattern holder (4) comprising at least one pattern,
  wherein the substrate holding unit (2), the lamp (3) and the pattern holder (4) are positioned on the skid (1) relative to each other such that light of the lamp (3) can illuminate the pattern of the pattern holder (4), and after said illumination can be projected onto the surface of the substrate, to which surface the coating composition has been applied to, and which is held by the substrate holding unit (2), and
- at least one camera (5),
  wherein said camera (5) is positioned on the skid (1) relative to the substrate holding unit (2) holding the substrate, to which surface the coating composition has been applied to, such that the camera (5) is capable of recording images of the light reflected off the surface of said substrate.

A further subject-matter of the present invention is a use of the inventive device for monitoring the drying and/or curing process of a coating composition applied at least partially onto at least one surface of a substrate and/or for studying the occurrence of surface and/or optical defects of a coating obtained from the coating composition during the drying and/or curing process.

A further subject-matter of the present invention is a kit-of-parts comprising the inventive device and an oven, wherein said oven comprises at least one opening through which skid (1) of the device can be at least partially moved into the oven, said opening being flush closable after skid (1) of the device has been moved into the oven.

A further subject-matter of the present invention is a method for monitoring the drying and/or curing process of a coating composition comprising at least one step (1), namely (1) monitoring the drying and/or curing process of a coating composition applied at least partially onto at least one surface of a substrate by making use of the inventive device or of the inventive kit-of-parts.

Preferably, said method is also a method for studying the occurrence of surface and/or optical defects of a coating obtained from the coating composition during the drying and/or curing process.

A further subject-matter of the present invention is a method of evaluating appearance properties and/or surface properties of a coating obtained by applying a coating composition onto at least one surface of a substrate during drying and/or curing by making use of the inventive device or of the inventive kit-of-parts, said method comprising at least steps (1a), (1b), (1c), (2) and (3), namely (1a) illuminating the at least one pattern of the pattern holder (4) with light by means of the least one lamp (3) used as light source, (1b) projecting said light from the at least one pattern of the pattern holder (4) after illumination to the surface of the substrate, to which surface the coating composition has been applied to and which is held by the substrate holding unit (2), and (1c) recording reflection images of the light reflected off the surface of the substrate and/or of the surface structure of the coating formed during drying and/or curing, the surface being the surface onto which the coating composition has been applied to, by means of camera (5).

(2) performing an image analysis of the images recorded in step (1b), and (3) evaluating the appearance properties and/or surface properties of the coating obtained by application of the coating composition onto the surface of the substrate.

It has surprisingly been found that the inventive device and the inventive method allow to monitor and to evaluate the drying and/or curing process of coating compositions, in particular of clearcoat compositions, applied onto optionally pre-coated suitable substrates, in particular in the field of the automotive industry, which drying and/or curing process resembles real conditions applied in automotive OEM or refinish manufactures as much as possible.

It has surprisingly been found that the inventive device and the inventive method allow studying the occurrence (or non-occurrence) of surface and/or optical defects of a coating obtained from the coating composition during its drying and/or curing process.

It has been further surprisingly found that the inventive device and the inventive method allow to monitor, to observe and to evaluate at what time (range) (e.g, shorter or longer drying period) and/or at what temperature (range) (e.g. lower or higher temperature) during the drying and/or curing process negative (undesired) properties such as sagging appear to begin to form, which may result in a non-smooth surface of the resulting coating after having performed the drying and/or curing process.

Moreover, it has been surprisingly found that the inventive device and the inventive method can be used in a wide range of applications such as during/for research and development including paint development and method development, as well as trouble-shooting. In particular, it has been found that the inventive device and the inventive method offer important insights in process formation of coating layers during drying/curing conditions.

It has been surprisingly found that the inventive device and the inventive method can be in particular used in case of clear coats and clearcoat compositions. However, the inventive device and the inventive method can also be used for other kinds of coating compositions such as electrodeposition coating compositions.

Additionally, it has been found that the inventive device and the inventive method allow a recording, in particular video-recording, of the drying and/or curing period in order to provide data, that can be used to evaluate in particular the levelling and sagging behavior at the time of drying/curing.

Further, it has been surprisingly found that the inventive device and the inventive method allow an automated evaluation of appearance (properties) and potentially occurring optical defects such as, e.g., runners, pinholes, mottling etc.

DETAILED DESCRIPTION

Device

The inventive device is a device for monitoring the drying and/or curing process of a coating composition applied at least partially onto at least one surface of a substrate, said device comprising a movable skid (1). Preferably, not only skid (1) but the inventive device as such is movable. The skid (1) or the device as such can be made movable for example by including rolls and/or wheels to the skid (1)/ device.

The substrate used can be an optionally pre-coated substrate, for example a substrate bearing at least a primer coating and/or electrodeposition coating, in particular when the aforementioned applied coating composition is a basecoat composition. In case the aforementioned applied coating composition is a clearcoat or topcoat coating composition, the substrate can be optionally additionally pre-coated with a basecoat layer. In case the aforementioned applied coating composition is an electrodeposition coating composition, it is for example possible that the substrate bears a primer coating layer. The substrate is preferably a metallic substrate. Suitable substrates are in particular any kind of substrates that can be used in the automotive industry including vehicles parts and/or bodies.

The term "drying" in the sense of the present invention preferably means "physical drying" of the coating composition applied at least partially onto at least one surface of a substrate by evaporation of the volatile components present therein, in particular organic solvent(s) and/or water at elevated temperatures, preferably at a temperature in the range of from 30° C. to 200° C. Such a physical drying is in particular performed when no crosslinking reactions of any of the components present in the coating composition takes place. Drying can be performed for a period of 10 minutes to 2 hours for example.

The term "curing" in the sense of the present invention preferably means "chemically curing" and/or "radiation curing" of the coating composition applied at least partially onto at least one surface of a substrate by crosslinking reactions of at least one, more preferably of at least two of the components present in the coating composition and/or by subjecting the coating composition in case it is radiation curable to a source of radiation such as UV light. Curing usually is also performed at elevated temperatures, preferably at a temperature in the range of from 30° C. to 200° and can go along with an evaporation of the volatile components present in the coating composition, in particular organic solvent(s) and/or water, i.e., can include a physical drying. Curing can be performed for a period of 10 minutes to 2 hours for example.

The inventive device can be used for vertical and/or horizontal drying and/or curing processes. By "vertical and/or horizontal drying and/or curing processes" it is meant in the sense of the present invention that the substrate is allowed to be placed in vertical or in horizontal within the skid (1) and, thus, also within an oven, when skid (1) is moved at least partially into an oven.

The movable skid (1), which is part of the inventive device, comprises at least one substrate holding unit (2) for holding the substrate, to which surface the coating composition has been applied to. The substrate holding unit (2) is capable of holding the substrate, to which surface the coating composition has been applied to, in vertical and/or in horizontal position, with respect to the bottom of the device and/or skid (1) or with respect to an oven, into which skid (1) may be at least partially placed through movement via rolls and/or wheels.

The movable skid (1), which is part of the inventive device, comprises at least one lamp (3) used as light source for illuminating the pattern of the pattern holder (4). The substrate held by the substrate holding unit (2) is in turn illuminated via a projection of the light after the aforementioned illumination from the pattern holder (4) including the pattern to the substrate. The pattern preferably is a checkered pattern. The resulting reflection images and the images of the surface structure of the substrate can then recorded by camera (5). The lamp (3) is preferably a Xe lamp. Preferably, said lamp shines on the pattern such as on the checkered pattern present in pattern holder (4) and after projection said pattern is reflected off the coated surface.

As outlined hereinbefore, the movable skid (1), which is part of the inventive device, comprises at least one pattern holder (4) comprising in turn at least one pattern. Preferably, said pattern holder (4) is positioned on the skid (1) relative to the lamp (3) and the substrate holding unit (2) such that the light of lamp (3) is—after illuminating the pattern in the pattern holder (4)—projected onto the surface of the substrate, to which surface the coating composition has been applied to. Thus the projection takes place by means and/or with aid of said pattern holder (4).

Preferably, the position of pattern holder (4) within the skid (1) is adjustable. Preferably, the pattern holder (4) is positioned on the skid (1) relative to the lamp (3) and the substrate holding unit (2) such that the light of lamp (3) is projected onto the surface of the substrate, to which surface the coating composition has been applied to, by means of said pattern holder (4) in an angle in the range of 40 to 50°, such as in an angle of 45°±1°. Thus, pattern holder (4), in particular the pattern contained therein, is illuminated by the light of lamp (3) and from there the light is projected onto the substrate. Preferably, said angle is below 45°, more preferably below 40°.

All kinds of patterns can be used in the pattern holder (4). In particular, a checkered pattern can be used.

The movable skid (1), which is part of the inventive device, comprises at least one camera (5), wherein said camera (5) is positioned on the skid (1) relative to the substrate holding unit (2) holding the substrate, to which surface the coating composition has been applied to, such that the camera (5) is capable of recording images of the light reflected off the surface of said substrate. Camera (5) is thus capable of recording reflection images, but can also be capable of recording images of the surface structure of the coatings formed during drying and/or curing.

Preferably, the position of camera (5) within the skid (1) is adjustable.

Preferably, the at least one camera (5) is positioned on the skid (1) relative to the substrate holding unit (2) holding the substrate, to which surface the coating composition has been applied to, such that it is capable of recording images of the light reflected off the surface of the substrate, in an angle of reflection in the range of from 85° to 95°, preferably in an angle of 90°±1°. Preferably, camera (5) is not only capable of recording images of the light reflected off the surface of the substrate, but also of recording images of the surface structure as such of the coatings formed during drying and/or curing.

Preferably, the at least one camera (5) is positioned on the skid (1) relative to the substrate holding unit (2) holding the substrate, in a camera angle of <45°, more preferably in a range of from <45° to 20°. This is in particular advantageous in case the coating composition, which has been applied to the substrate held by the substrate holder (2), is a clearcoat composition and said substrate is a substrate that already bears at least one basecoat layer, which in turn contains at least one preferably metallic effect pigment, i.e. bears at least one metallic basecoat layer. The aforementioned clearcoat composition has then been applied to the basecoat layer.

Preferably, the at least one camera (5) is a video camera. For example, a CCD (charge coupled device) camera can be used as camera (5). Camera (5) preferably comprises at least one camera lens. Exemplary commercially available camera models, that are suitable for use as camera (5) of the inventive device, are a Basler acA2040-29uc camera or a UI-3860LE-C-HQ camera.

Preferably, the skid (1) of the inventive device further comprises at least one endoscope (6), preferably at least one video borescope. The endoscope (6) may then be placed in the oven in the drying/curing process, preferably under cooling, when and in case skid (1) in moved into an oven. Preferably, the endoscope (6) comprises a cooling system, which allows cooling of the endoscope (6) when it is present in an oven, in particular at elevated temperatures.

Preferably, the inventive device further comprises an oven, wherein skid (1) can be at least partially moved into.

Preferably, the inventive device consists of skid (1). However, skid (1) may comprise—besides substrate holding unit (2), lamp (3) pattern holder (4) including pattern and camera (5)—further components present on or connected to the skid (1) such as, e.g., a computer/computer system, which is connected to the camera (5). Of course, the part of the skid (1) containing the computer/computer system is not to be moved into the oven.

Further, skid (1) or the inventive device may further comprise a further light source capable of an illumination of background light. Such a light source may be, e.g., a LED panel. The presence of such a light source may facilitate the recording images of the light reflected off the surface of the substrate and/or improve the quality of such images.

Use of the Device

A further subject-matter of the present invention is a use of the inventive device for monitoring the drying and/or curing process of a coating composition applied at least partially onto at least one surface of a substrate and/or for studying the occurrence of surface and/or optical defects of a coating obtained from the coating composition drying and/or curing.

All preferred embodiments described hereinbefore in connection with the inventive device are also preferred embodiments in relation to the inventive use of the device.

Kit-of-Parts

A further subject-matter of the present invention is a kit-of-parts comprising the inventive device and an oven, wherein said oven comprises at least one opening through which skid (1) of the device can be at least partially moved into the oven, said opening being flush closable after skid (1) of the device has been moved into the oven.

All kinds of conventional ovens can serve as basis for the oven of the inventive kit-of-parts such as conventional drying ovens with a suitable heating system. However, the oven of the inventive kit-of-parts must contain an opening which is flush closable after skid (1) of the device has been moved into the oven in order to ensure that the oven, in particular its heating system, can be used economically.

All preferred embodiments described hereinbefore in connection with the inventive device and the use thereof also preferred embodiments in relation to the inventive kit-of-parts.

Method of Monitoring the Drying and/or Curing Process

A further subject-matter of the present invention is a method for monitoring the drying and/or curing process of a coating composition comprising at least one step (1), namely (1) monitoring the drying and/or curing process of a coating composition applied at least partially onto at least one surface of a substrate by making use of the inventive device or of the inventive kit-of-parts.

All preferred embodiments described hereinbefore in connection with the inventive device, the use thereof and the inventive kit-of-parts also preferred embodiments in relation to the inventive method of monitoring the drying and/or curing process.

The inventive method is preferably also a method for studying the occurrence of surface and/or optical defects of a coating obtained from the coating composition during drying and/or curing.

Preferably, step (1) of the inventive method is performed by (1a) illuminating the at least one pattern of the pattern holder (4) with light by means of the least one lamp (3) used as light source, (1b) projecting said light from the at least one pattern of the pattern holder (4) after illumination to the surface of the substrate, to which surface the coating composition has been applied to and which is held by the substrate holding unit (2), and (1c) recording reflection images of the light reflected off the surface of the substrate and/or of the surface structure of the coating formed during drying and/or curing, the surface being the surface onto which the coating composition has been applied to, by means of camera (5).

Preferably, the angle of reflection, in which the light is reflected off the surface, in particular according to (1c), is in the range of from 85° to 95°, preferably in an angle of 90°±1°.

Preferably, monitoring the drying and/or curing process in step (1)—including sub-steps (1a), (1b) and (1c)—of the inventive method, in particular the recording of reflection images of the light reflected off the surface of the substrate and/or of the surface structure of the coating formed during drying and/or curing according to sub-step (1b), is performed (i) directly after application of the coating composition onto the at least one surface of the substrate, preferably outside an oven, (ii) during the flash-off period, preferably outside an oven, (iii) during the drying and/or curing process, preferably inside an oven, and/or (iv) during the cooling down period, preferably outside an oven.

The term "flashing off" or "flash-off period" in the sense of the present invention preferably means a drying of the coating composition applied at least partially onto at least one surface of a substrate by evaporation of the volatile components present therein, in particular organic solvent(s) and/or water, at room temperatures, in particular in the range of from 18 to <30° C. Such a flashing off is in particular performed for a period of 5 to 30 minutes for example.

Preferably, monitoring the drying and/or curing process in step (1) of the inventive method is performed according to (ii), (iii) and/or (iv).

Preferably, monitoring the drying and/or curing process in step (1) of the inventive method, in particular the recording of reflection images of the light reflected off the surface of the substrate and/or of the surface structure of the coating formed during drying and/or curing according to sub-step (1c), is performed (ii) during the flash-off period for a period of 1 minute to 15 minutes, more preferably for a period of 5 minutes to 15 minutes, preferably outside an oven, preferably at a temperature in the range of from 18 to 25° C., (iii) during the drying and/or curing process for a period of >15 minutes to 80 minutes, more preferably for a period of >15 minutes to 60 minutes, preferably inside an oven, preferably at a temperature in the range of from 40° C. to 200° C., preferably at a temperature in the range of from 60° C. to 150° C., and/or (iv) during the cooling down period for a period of 1 minute to 20 minutes, more preferably for a period of 5 minutes to 15 minutes, preferably outside an oven, preferably at a temperature in the range of from 18 to 25° C.

Preferably, at least during (iii) the skid (1) of the inventive device is at least partially moved into an oven, preferably into an oven as described in the context of the inventive kit-of-parts.

Preferably, the monitoring of the drying and/or curing process is performed by making use of a tracer, which are distributed on the coated surface, i.e. on the surface of the substrate directly after application of the coating composition onto the at least one surface of the substrate. The use of such a tracer is advantageous as an optimal focusing, in particular auto-focusing, on the surface of the substrate is concerned, and/or to avoid any mis-focusing. While the pattern contained in the pattern holder (4) such as a checkered pattern is reflected by the surface, this reflection may otherwise be distorted by the structure of the surface. Preferred tracers are glass flakes. Preferably, these are manually distributed, preferably finely distributed, on the surface of the substrate directly after application of the coating composition. Such a distribution can be regarded as a "scattering" onto the film surface. The use of tracers is in particular advantageous in order to optimal focus on the surface of the substrate for evaluating the levelling and/or sagging behavior.

Preferably, the images recorded by the at least one camera (5) of the inventive device or of the device of the inventive kit-of-parts are further subjected to an image analysis, preferably with the aid and/or use of at least one software. Preferably, the image analysis is or is based on a FT-analysis (Fourier transformation analysis).

Preferably, the images recorded do not contain any scale bars, since the images are subject to distortion. Thus, in the images recorded preferably no distortion of the reflected pattern, which is contained in pattern holder (4), can be observed. This is in particular achieved by adjusting the angle between the pattern of the pattern holder (4) and the surface of the substrate, present in the substrate holder (2), which preferably is in the range of 85 to 95°, preferably in an angle of 90°±1°.

Preferably, step (1) of the inventive method is performed by endoscopic adaptation, in particular by means of at least one endoscope (6) positioned on skid (1) of the inventive device or of the device of the inventive kit-of-parts. The endoscope (6) may then be placed in the oven in the drying/curing process, preferably under cooling, when and in case skid (1) in moved into an oven.

Method of Evaluating Appearance Properties and/or Surface Properties

A further subject-matter of the present invention is a method of evaluating appearance properties and/or surface properties of a coating obtained by applying a coating composition onto at least one surface of a substrate during drying and/or curing by making use of the inventive device or of the inventive kit-of-parts comprising at least steps (1a), (1b), (1c), (2) and (3), namely (1a) illuminating the at least one pattern of the pattern holder (4) with light by means of the least one lamp (3) used as light source, (1b) projecting said light from the at least one pattern of the pattern holder (4) after illumination to the surface of the substrate, to which surface the coating composition has been applied to and which is held by the substrate holding unit (2), and (1c) recording reflection images of the light reflected off the surface of the substrate and/or of the surface structure of the coating formed during drying and/or curing, the surface being the surface onto which the coating composition has been applied to, by means of camera (5), (2) performing an image analysis of the images recorded in step (1 b), and (3) evaluating the appearance properties and/or surface properties of the coating obtained by application of the coating composition onto the surface of the substrate.

All preferred embodiments described hereinbefore in connection with the inventive device, the use thereof, the inventive kit-of-parts and the inventive method of monitoring the drying and/or curing process also preferred embodiments in relation to the inventive method of evaluating appearance properties and/or surface properties of a coating.

Preferably, the image analysis according to step (2) is performed with the aid and/or use of at least one software. Preferably, the image analysis is or is based on a FT-analysis (Fourier transformation analysis). Preferably, the evaluation according to step (3) is performed with the aid and/or use of at least one software.

Figure 1:
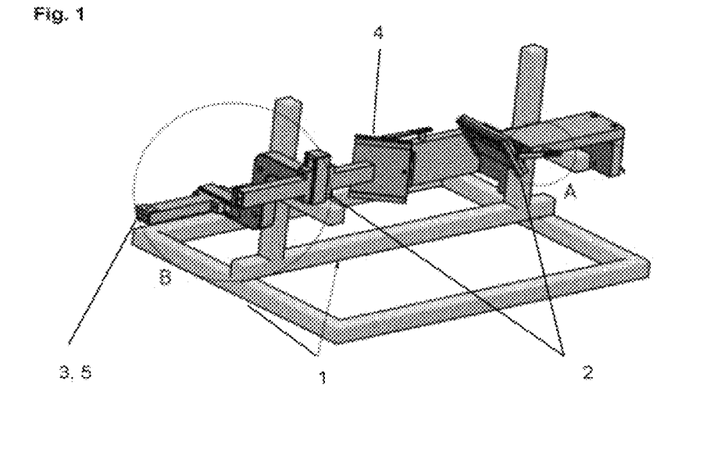
FIG. 1 shows an exemplary skid (1) according to the invention.
Figure 2:
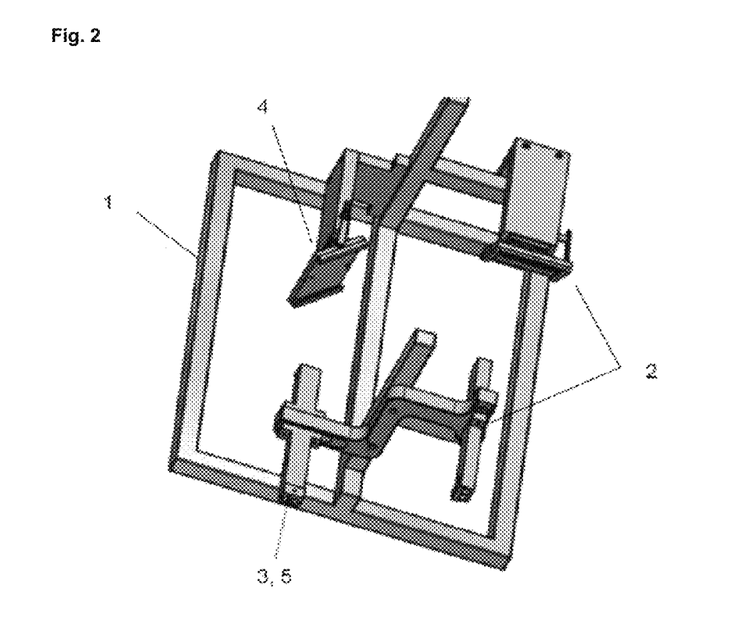
FIG. 2 shows the exemplary skid (1) according to the invention as shown in FIG. 1 from another perspective.

FIG. 1 shows an exemplary skid (1) according to the invention. In FIG. 1 two sections "A" and "B" are indicated. These sections are further explained in detail in the respective excerpts of FIG. 1 shown in FIG. 3 and FIG. 4. FIG. 2 shows the exemplary skid (1) according to the invention as shown in FIG. 1 from another perspective. Skid (1) according to FIG. 1 and FIG. 2 comprises a substrate holding unit (2), which allows both a horizontal or a vertical arrangement of the substrate within skid (1) with respect to the bottom of skid (1) and thus with an oven when skid (1) is moved into said oven. Skid (1) further comprises a pattern holder (4). Further, skid (1) contains a lamp (3) used as light source and a camera (5). Lamp (3) and Camera (5) per se are not shown in FIG. 1 and FIG. 2 for illustrative reasons. However, the respective positions of skid (1), wherein these are placed, are indicated in FIG. 1 and FIG. 2.

Figure 3:
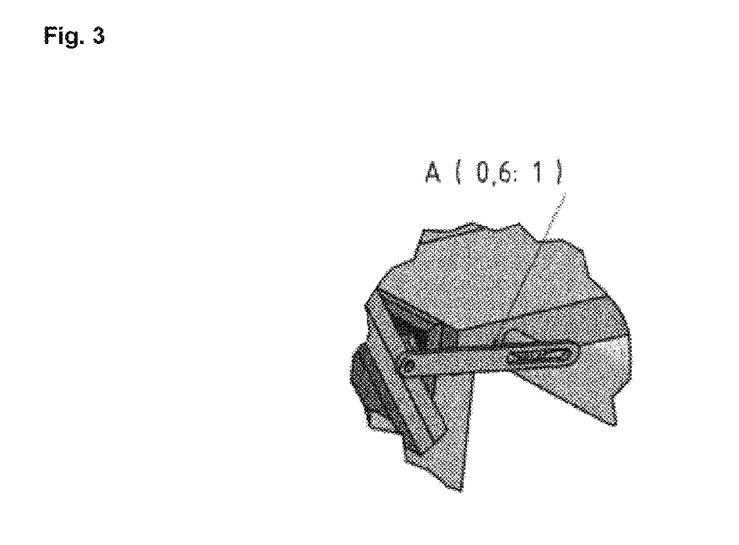
FIG. 3 is an excerpt of the drawing of FIG. 1 showing in detail the section indicated as section "A" in FIG. 1.
Figure 4:
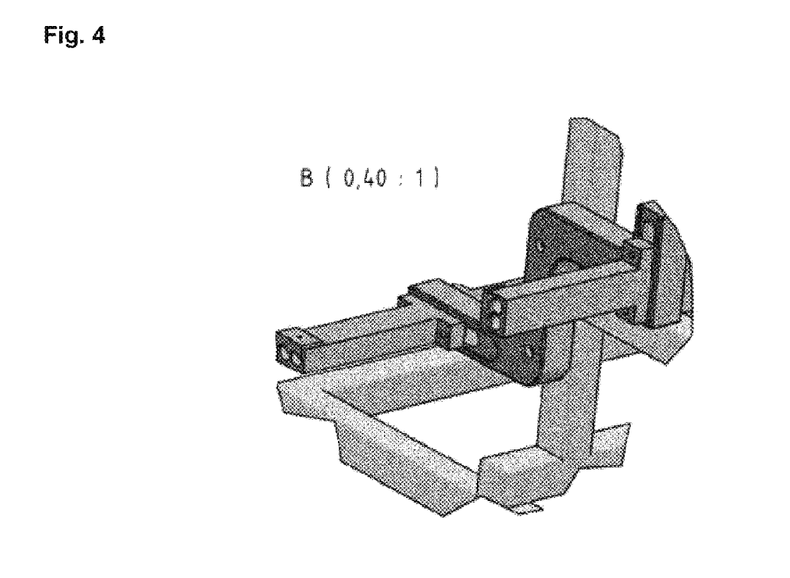
FIG. 4 is an excerpt of the drawing of FIG. 1 showing in detail the section indicated as section "B" in FIG. 1.

FIG. 3 is an excerpt of the drawing of FIG. 1 showing in detail the section indicated as section "A" in FIG. 1. FIG. 4 is an excerpt of the drawing of FIG. 1 showing in detail the section indicated as section "B" in FIG. 1.

Figure 5:
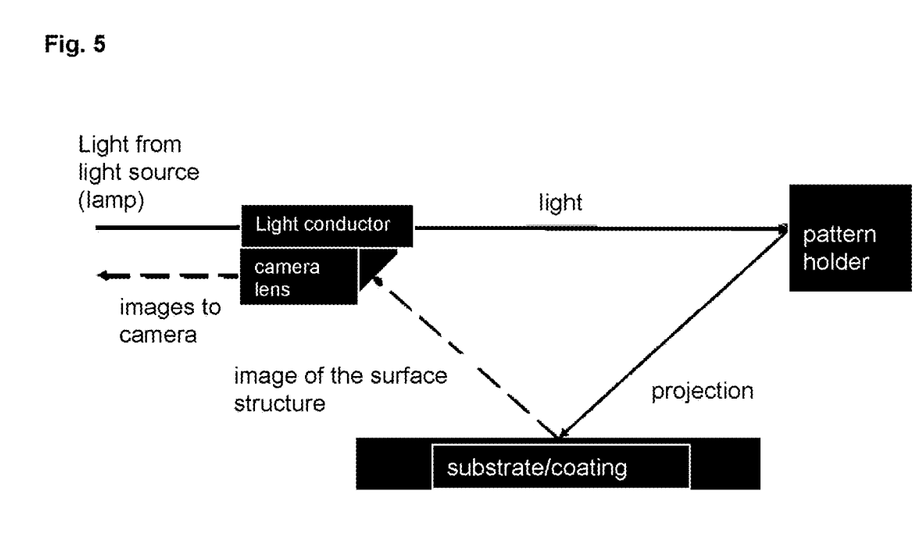
FIG. 5 shows an experimental setup for performing the inventive methods by making use of the inventive device.

FIG. 5 shows an experimental setup for performing the inventive methods by making use of the inventive device. In FIG. 5 the at least one camera (5) is positioned on the skid (1) relative to the substrate holding unit (2) holding the substrate, to which surface the coating composition has been applied to, such that it is capable of recording images of the light reflected off the surface of the substrate, in an angle of reflection of 90°. In FIG. 5 the at least one camera (5) is positioned on the skid (1) relative to the substrate holding unit (2) holding the substrate, in a camera angle of 45°. The pattern holder (4) is positioned on the skid (1) relative to the lamp (3) and the substrate holding unit (2) such that the light of lamp (3) is projected onto the surface of the substrate, to which surface the coating composition has been applied to, by means of said pattern holder (4) in an angle of projection of 45°.

EXAMPLES

The inventive and comparative examples below serve to illustrate the invention, but should not be interpreted as limiting.

Figure 6:
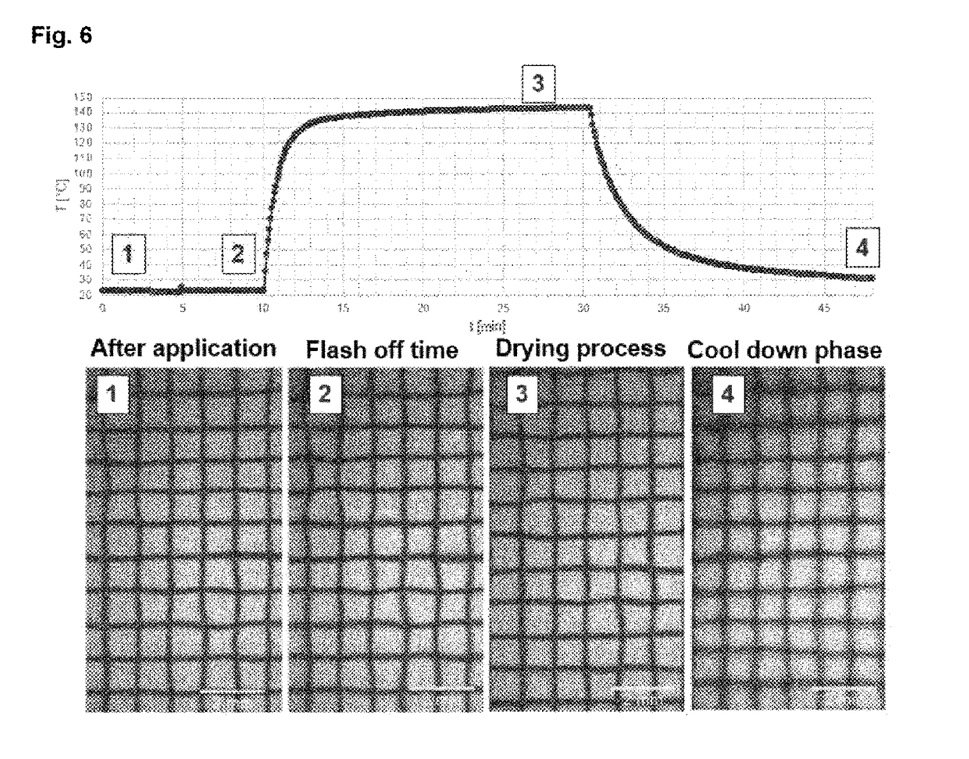
FIG. 6 shows the recorded images of different phases of monitoring drying and/or curing process.

A commercial clearcoat composition has been applied onto a substrate and the drying and/or curing process thereof has been monitored by making use of the inventive device. Further, the appearance properties and/or surface properties of the resulting coating have been evaluated. In particular, the waviness and sagging behavior during drying and/or curing has been video-recorded and evaluated. In the case of known oven curves, it is possible to assign changes in the flow to a temperature at certain points in time as it is illustrated in the upper part of FIG. 6. A vertical setup has been used.

The drying and/or curing process has been monitored and evaluated (i) directly after application, (ii) during flash-off (10 minutes at 23° C.), (iii) during baking in a drying oven ("drying") (20 minutes at 140° C.) and (iv) in the cooldown phase (10 minutes until 23° C. have been reached). An image is recorded every 10 seconds (as camera a Basler acA2040-29uc or a UI-3860LE-C-HQ has been used). The images recorded are displayed in the lower part of FIG. 6. It can be observed that short waves (SW) appear primarily in the cooldown phase.

Figure 7:
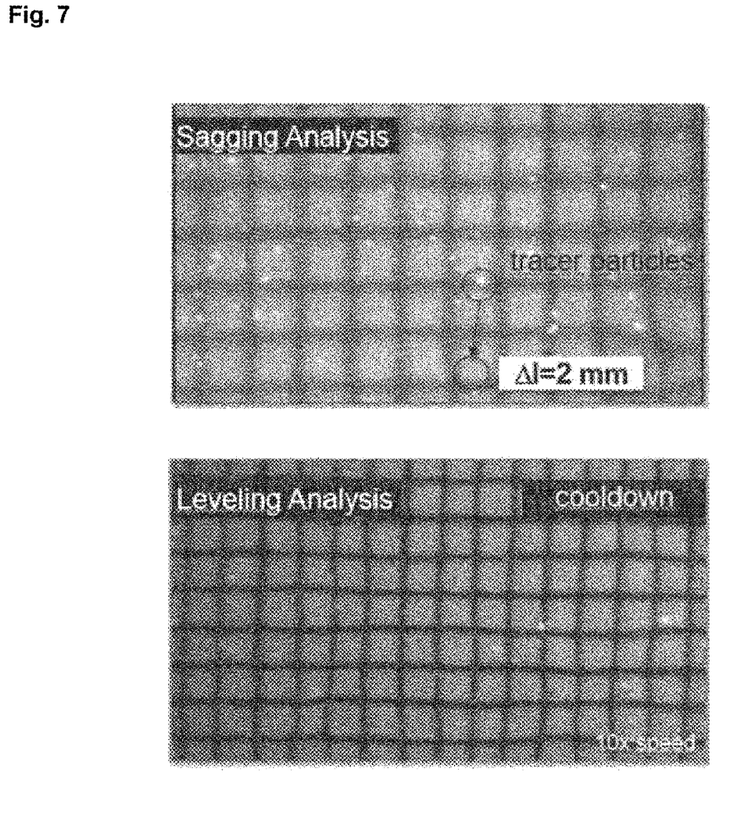
FIG. 7 shows the video-recorded images of the results of the leveling and sagging analysis.

By performing an image analysis of the images video-recorded the leveling and sagging behavior can be evaluated. The results are displayed in FIG. 7.

The invention claimed is:

1. A device for monitoring the drying and/or curing process of a coating composition applied at least partially onto at least one surface of a substrate, said device comprising a movable skid, the skid in turn comprising
at least one substrate holding unit for holding the substrate, to which surface the coating composition has been applied to,
at least one lamp used as light source,
at least one pattern holder comprising at least one pattern, wherein the substrate holding unit, the lamp and the pattern holder are positioned on the skid relative to each other such that light of the lamp can illuminate the pattern of the pattern holder, and, after said illumination, can be projected onto the surface of the substrate, to which surface the coating composition has been applied to, and which is held by the substrate holding unit, and
at least one camera,
wherein said camera is positioned on the skid relative to the substrate holding unit holding the substrate, to which surface the coating composition has been applied to, such that the camera is capable of recording images of the light reflected off the surface of said substrate,
wherein the device further comprises an oven, in which the skid can be at least partially moved into.

2. The device according to claim 1, characterized in that the camera is positioned on the skid relative to the substrate holding unit holding the substrate, to which surface the coating composition has been applied to, such that it is capable of recording images of the light reflected off the surface of the substrate, in an angle of reflection in the range of from 85° to 95°.

3. The device according to claim 1, characterized in that the pattern holder is positioned on the skid relative to the lamp and the substrate holding unit such that the light of the lamp is projected onto the surface of the substrate, to which surface the coating composition has been applied to, by means of said pattern holder in an angle in the range of 40 to 50°.

4. The device according to claim 1, characterized in that the skid of the device further comprises at least one endoscope.

5. A method of using the device according to claim 1, the method comprising using the device for monitoring the drying and/or curing process of a coating composition applied at least partially onto at least one surface of a substrate and/or for studying the occurrence of surface and/or optical defects of a coating obtained from the coating composition during the drying and/or curing process.

6. The device according to claim 1, characterized in that camera is positioned on the skid relative to the substrate holding unit holding the substrate, to which surface the coating composition has been applied to, such that it is capable of recording images of the light reflected off the surface of the substrate, in an angle of reflection of 90°±1°.

7. The device according to claim 1, characterized in that the pattern holder is positioned on the skid relative to the lamp and the substrate holding unit such that the light of lamp is projected onto the surface of the substrate, to which surface the coating composition has been applied to, by means of said pattern holder in an angle of 45°±1°.

8. The device according to claim 1, characterized in that skid of the device further comprises at least one video borescope.

9. The device according to claim 1, wherein the skid comprises rolls and/or wheels, which make the skid movable.

10. The device according to claim 1, wherein the device comprises rolls and/or wheels, which make the device movable.

11. A kit-of-parts comprising a device for monitoring the drying and/or curing process of a coating composition applied at least partially onto at least one surface of a substrate, said device comprising a movable skid, the skid in turn comprising
at least one substrate holding unit for holding the substrate, to which surface the coating composition has been applied to,
at least one lamp used as light source,
at least one pattern holder comprising at least one pattern, wherein the substrate holding unit, the lamp and the pattern holder are positioned on the skid relative to each other such that light of the lamp can illuminate the pattern of the pattern holder, and, after said illumination, can be projected onto the surface of the substrate, to which surface the coating composition has been applied to, and which is held by the substrate holding unit, and
at least one camera,
wherein said camera is positioned on the skid relative to the substrate holding unit holding the substrate, to which surface the coating composition has been applied to, such that the camera is capable of recording images of the light reflected off the surface of said substrate,
and an oven, wherein said oven comprises at least one opening through which the skid of the device can be at least partially moved into the oven, said opening being flush closable after the skid of the device has been moved into the oven.

12. A method for monitoring the drying and/or curing process of a coating composition comprising at least one step (1), namely
(1) monitoring the drying and/or curing process of a coating composition applied at least partially onto at least one surface of a substrate by making use of the device according to claim 1.

13. The method according to claim 12, characterized in that step (1) is performed by
(1a) illuminating the at least one pattern of the pattern holder with light by means of the least one lamp used as light source,
(1b) projecting said light from the at least one pattern of the pattern holder after illumination to the surface of the substrate, to which surface the coating composition has been applied to and which is held by the substrate holding unit, and (1c) recording reflection images of the light reflected off the surface of the substrate and/or of the surface structure of the coating formed during drying and/or curing, the surface being the surface onto which the coating composition has been applied to, by means of the camera.

14. The method according to claim 13, characterized in that the angle of reflection, in which the light is reflected off the surface, is in the range of from 85° to 95°.

15. The method according to claim 13, characterized in that the images recorded by the at least one camera are further subjected to an image analysis.

16. A method of evaluating appearance properties and/or surface properties of a coating obtained by applying a coating composition onto at least one surface of a substrate during drying and/or curing by making use of the device, the method comprising at least steps (1a), (1b) and (1c) as defined in claim 13 as well as steps (2) and (3), namely
    (2) performing an image analysis of the images recorded in step (1c), and
    (3) evaluating the appearance properties and/or surface properties of the coating obtained by application of the coating composition onto the surface of the substrate.

17. The method according to claim 13, characterized in that the angle of reflection, in which the light is reflected off the surface, is 90°±1°.

18. The method according to claim 13, characterized in that the images recorded by the at least one camera are further subjected to an image analysis with the aid and/or use of at least one software.

19. The method according to claim 12, characterized in that monitoring the drying and/or curing process in step (1) is performed
    (i) directly after application of the coating composition onto the at least one surface of the substrate outside an oven,
    (ii) during the flash-off period outside an oven,
    (iii) during the drying and/or curing process in an oven, and/or
    (iv) during the cooling down period outside an oven.

20. The method according to claim 12, characterized in that monitoring the drying and/or curing process is performed by making use of tracers, which are distributed on the coated surface of the substrate directly after application of the coating composition onto the at least one surface of the substrate.

21. The method according to claim 12, characterized in that step (1) is performed by endoscopic adaptation, in particular by means of at least one endoscope positioned on the skid of the device.

\* \* \* \* \*